United States Patent [19]

Neri et al.

[11] Patent Number: 5,926,941
[45] Date of Patent: Jul. 27, 1999

[54] ARMATURE PALLET

[75] Inventors: Paolo Neri, Tavarnelle Val di Pesa; Walter Bonura, Sesto Fiorentino, both of Italy

[73] Assignee: Axis USA, Inc., Tampa, Fla.

[21] Appl. No.: 08/882,916

[22] Filed: Jun. 26, 1997

Related U.S. Application Data

[60] Provisional application No. 60/022,279, Jul. 23, 1996.

[51] Int. Cl.⁶ .......................... H02K 15/02; B65G 15/64
[52] U.S. Cl. .................. 29/598; 29/597; 29/732; 29/733; 29/736; 198/345.3; 198/346.2; 198/867.11
[58] Field of Search ................ 29/597, 598, 564.5, 29/799, 732, 733, 822, 736; 198/345.3, 346.2, 867.08, 867.11, 465.2

[56] References Cited

U.S. PATENT DOCUMENTS

| | | | |
|---|---|---|---|
| 4,306,646 | 12/1981 | Magni | 198/341 |
| 4,363,434 | 12/1982 | Flury | 198/345.3 |
| 4,718,533 | 1/1988 | Nussbaumer et al. | 198/346.1 |
| 4,965,924 | 10/1990 | Santandrea et al. | 29/596 |
| 4,984,353 | 1/1991 | Santandrea et al. | 29/714 |
| 5,060,780 | 10/1991 | Santandrea et al. | 198/345.1 |
| 5,060,781 | 10/1991 | Santandrea et al. | 198/345.1 |
| 5,065,499 | 11/1991 | Luciano et al. | 29/799 |
| 5,099,978 | 3/1992 | Santandrea et al. | 198/345.1 |
| 5,115,901 | 5/1992 | Santandrea et al. | 198/345.3 |
| 5,240,235 | 8/1993 | Santandrea et al. | 269/50 |
| 5,255,778 | 10/1993 | Santandrea et al. | 198/803.11 |
| 5,346,058 | 9/1994 | Santandrea et al. | 198/803.01 |
| 5,348,142 | 9/1994 | Nishimura et al. | 198/803.01 |
| 5,373,623 | 12/1994 | Santandrea et al. | 29/596 |
| 5,474,166 | 12/1995 | Santandrea et al. | 198/345.3 |
| 5,653,014 | 8/1997 | Faraoni et al. | 29/732 |
| 5,680,696 | 10/1997 | Bonura et al. | 29/732 |
| 5,685,413 | 11/1997 | McGough | 29/33 P |

FOREIGN PATENT DOCUMENTS 0715929  11/1996  European Pat. Off. ................ 29/559

*Primary Examiner*—Peter Vo
*Assistant Examiner*—A. Dexter Tugbang
*Attorney, Agent, or Firm*—Fish & Neave; Jeffrey H. Ingerman

[57] ABSTRACT

A pallet and system for transporting armatures along an armature manufacturing line, where the armatures may change in configuration at different stations of the manufacturing line, accommodates the various configurations without requiring a change of pallets at a station at which a configuration change occurs. The pallet has multiple sets of seats, each set corresponding to one of the configurations that the armature may assume during processing. Whenever the configuration of the armature changes from a first configuration to a second configuration, the armature, having been removed from a set of seats that accommodates the first configuration, is replaced in a set of seats accommodating the second configuration. One way of accomplishing the transfer is, after lifting the armature from the first set of seats, allowing the pallet to advance by the distance separating the first and second sets of seats. The armature can then be lowered directly into the second set of seats without the need for lateral movement.

22 Claims, 4 Drawing Sheets

ARMATURE PALLET

CROSS REFERENCE TO RELATED APPLICATION

This claims the benefit of copending, commonly-assigned U.S. Provisional Patent Application No. 60/022,279, filed Jul. 23, 1996.

BACKGROUND OF THE INVENTION

The present invention relates to a pallet for transporting an armature between processing stations of an armature manufacturing line, before incorporation of the armature in a dynamoelectric machine such as an electric motor. In particular, this invention relates to such a pallet which can handle the armature in more than one state, as the state of the armature is altered during manufacture.

An armature of a dynamoelectric machine has a length defined by its shaft, which ordinarily does not change during manufacturing. It is therefore common to support an armature on a pallet, which moves the armature from station to station of a manufacturing line, by supporting the ends of the armature shaft. At any particular processing station of the manufacturing line, the armature may be processed while it is still supported on the pallet. Alternatively, the armature may be removed from the pallet by equipment at the processing station, processed, and returned to the pallet.

However, characteristics of the armature other than length may change during manufacture. For example, while the shaft ends normally have fixed diameters, at certain stages during manufacture the diameter of a shaft end may be temporarily increased. In particular, when a commutator is being placed on the shaft, there are steps during which the commutator remains at the end of the shaft, effectively increasing the shaft diameter at that end. The supports on the pallet, which are designed to handle the unincreased shaft diameter, cannot hold the shaft during that time.

It is known to provide pallets that can be adjusted to accommodate armatures of different lengths. Such pallets are shown, for example, in commonly-assigned U.S. Pat. Nos. 5,060,780, 5,060,781, 5,099,978, 5,115,901, 5,255, 778, 5,346,058 and 5,474,166. Similarly, pallets that can be adjusted to accommodate stators of different sizes are shown, for example, in commonly-assigned U.S. Pat. Nos. 4,965,924, 5,065,499, 5,240,235 and 5,373,623. However, such pallets are adjusted once for a particular armature or stator configuration at the beginning of the manufacture of that armature or stator.

It would be desirable to be able to provide an armature pallet that can accommodate an armature as the configuration of the armature changes through different steps of the armature manufacturing process.

SUMMARY OF THE INVENTION

It is an object of this invention to provide an armature pallet that can accommodate an armature as the configuration of the armature changes through different steps of the armature manufacturing process.

In accordance with the invention, there is provided a pallet for transporting an armature of a dynamoelectric machine along an armature manufacturing line, where the armature has a shaft, and the shaft has first and second shaft ends. The pallet includes a base and at least one pair of spaced apart supports on the base. The at least one pair of spaced apart supports has at least two sets of seats for receiving the first and second shaft ends, each of the sets including first and second seats. The first seat of each of the at least two sets of seats is on a first member of said at least one pair of spaced apart supports, and the second seat of each of the at least two sets of seats is on a second member of said at least one pair of spaced apart supports. The first and second seats of a first of the sets of seats are in a first seat configuration for accepting the armature when the armature is in a first armature configuration, and the first and second seats of a second of the sets of seats are in a second seat configuration for accepting the armature when the armature is in a second armature configuration different from the first armature configuration. When the pallet transports an armature along the armature manufacturing line and the armature is altered, at a station of the manufacturing line, from one of the first and second armature configurations to the other of the first and second armature configurations, the armature can be placed in one of the first and second sets of seats according to that other of said first and second armature configurations.

A system incorporating such a pallet, and a method of operating such a system, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
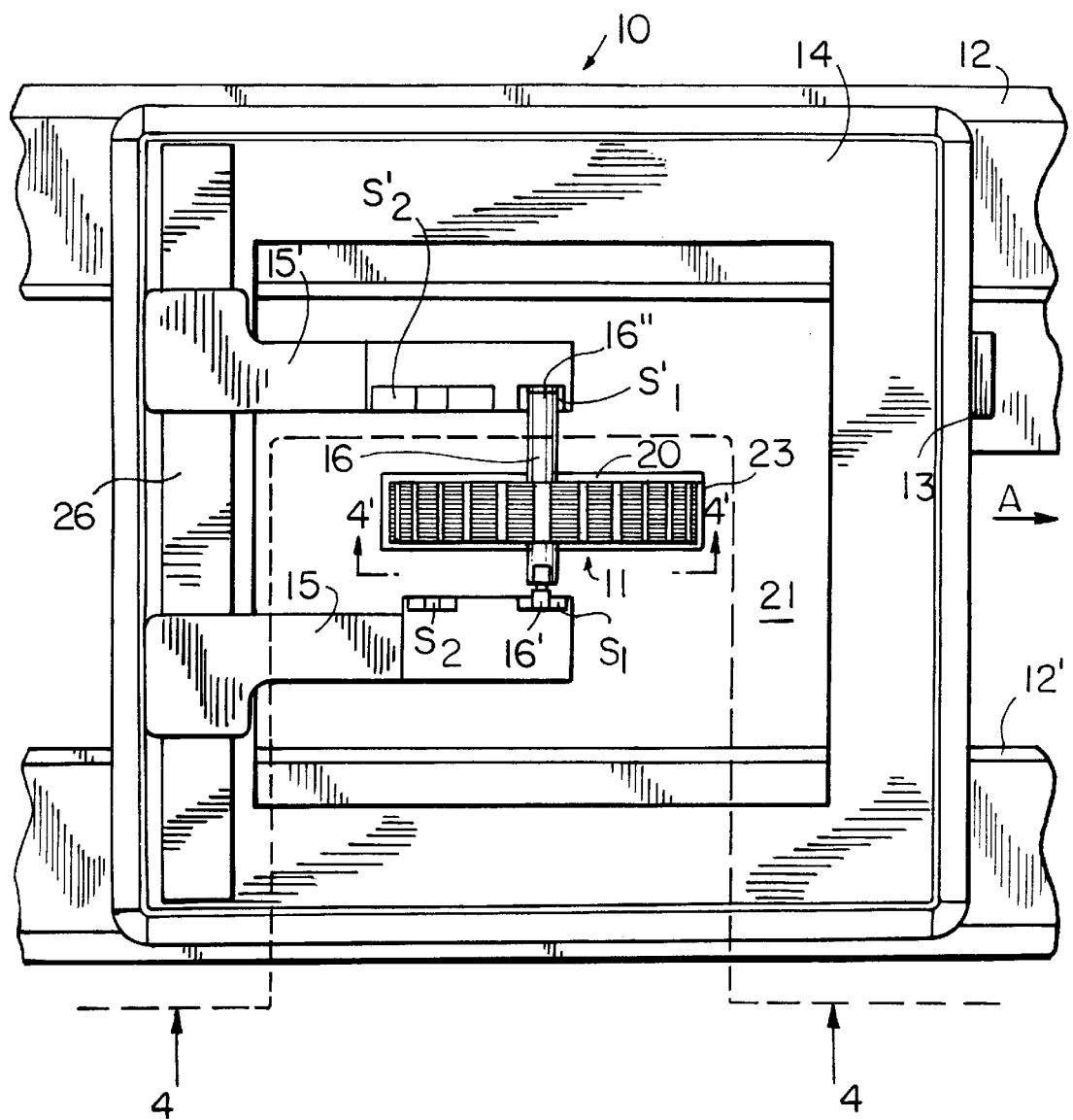
FIG. 1 is a plan view of a preferred embodiment of a pallet according to the present invention, being advanced by a conveyor of a preferred embodiment of a system according to the present invention, while carrying an armature in a first armature configuration.

The present invention accommodates the aforementioned changes in armature configuration during armature manufacture by providing a pallet having at least two different sets of seats. The actual number of sets of seats provided would preferably be at least equal to the number of different configurations that an armature can assume during manufacture. In the discussion that follows, and in the illustrated embodiment, that number is assumed to be two; however, a greater number may be possible.

The seats of the pallet according to the invention preferably are located on spaced-apart supports. Those supports preferably are spaced apart by approximately the length of the armature shaft, so that the ends of the armature shaft rest in the seats. One set of seats preferably has seats whose sizes and shapes accommodate the shaft ends of the armature in their original states. The other set or sets of seats preferably have seats whose sizes and shapes accommodate the armature in one or more of the other configurations.

For example, if the armature shaft has a substantially constant diameter, the seats in the first set of seats preferably would be substantially identical. In the preferred embodiment, there is only one other armature configuration, which is that which arises from the placement of the commutator on one end of the shaft, temporarily increasing the diameter of that end of the shaft until the commutator is advanced further onto the shaft to its permanent position. Thus, in that embodiment, there preferably would be a second set of seats in which one seat preferably would be substantially identical to the seats in the first set of seats, while the other seat in the second set of seats would be larger to accommodate the commutator.

The armature would remain in the first set of seats, possibly being removed from, and replaced in, that set of seats at various stations as processing required, until it reached a station at which its configuration was to be changed by placement of the commutator on the end of the shaft. At that station, the armature would be removed from the first set of seats and would be replaced in the second set of seats. That could be accomplished by having the equipment that raises and lowers the armature also move laterally from one set of seats to the other set of seats. However, preferably, the pallet has an open base and rides on a conveyor having two spaced-apart belts, and the armature is raised and lowered by a cradle that rises through the open base from below the pallet between the belts, without the ability to move laterally. Instead, to move the armature to the second set of seats, the pallet, after being stopped to allow raising of the armature from the first set of seats, would be allowed to move an amount substantially equal to the distance separating the two sets of seats, thereby aligning the cradle holding the armature with the second set of seats. Then, when the cradle is lowered after processing of the armature, the armature would be placed in the second set of seats.

This is preferably accomplished by using a system in which the belts of the conveyor ordinarily do not stop moving when a pallet reaches a station. Pallets are stopped at the various stations by brake mechanisms, each of which includes an abutment member that ordinarily remains below the plane of the conveyor belts, but can be extended into the path of the pallet to prevent the pallet from advancing as the conveyor continues to move. The materials of the pallet and the belts preferably are selected so that their relative coefficient of friction allows the belts to slide past the pallet without binding, and without damaging either the belts or the pallet.

At a station at which the armature is to be moved from the first set of seats to the second set of seats, the braking mechanism preferably includes a second abutment member preferably spaced from the first abutment member by the distance between the sets of seats. Preferably, the first abutment member stops the pallet with the first set of seats aligned with the cradle. The cradle then lifts the armature from the first set of seats for placement of the commutator. During commutator placement, the second abutment member is preferably extended into the path of the pallet and the first abutment member is then retracted, allowing the pallet to advance until it reaches the second abutment member, whereupon the second set of seats is aligned with the cradle. The cradle then lowers the armature onto the second set of seats.

Similarly, when the armature reaches the processing station at which the commutator is moved to its final position, again exposing the end of the shaft, it is necessary to replace the armature on the pallet in the first set of seats. One way to accomplish this is to have the equipment at that station move the armature laterally. For example, the second abutment member can be mounted a movable mount, with a suitable actuator, such as a hydraulic or pneumatic cylinder, that can move the mount and the second abutment member against the direction of motion of the conveyor.

While any suitably shaped seats can be provided on the pallet, the seats of the preferred embodiment of a pallet according to this invention are preferably V-shaped. This allows for positive positioning of the armature, as compared to a seat that, e.g., is rounded or U-shaped to match the shape of the shaft. Specifically, use of rounded seats would require that there be some clearance between the shaft and the seat, which would allow some movement. On the other hand, with V-shaped seats, the shaft would preferably seat itself at some position in which the walls of the "V" are substantially tangent to the shaft, at which point there would preferably be substantially no relative movement between the shaft and the seats.

FIGS. 1–4 show a preferred embodiment of a pallet 10 and system according to this invention being used to transport an armature 11 between various processing stations of a manufacturing line. FIG. 1 is a plan view of pallet 10 as it transports armature 11 in the direction shown by arrow A along a manufacturing line in the initial stages of manufacturing. Pallet 10, as shown in FIG. 1, preferably rests on preferably continuously moving spaced apart conveyor belts 12, 12', which move pallet 10 between the stations of the manufacturing line. Pallet 10 can be stopped at a station for processing armature 11 by an abutment member 13 placed in a predetermined location near the station. To stop pallet 10, abutment member 13, which preferably is normally retracted below the plane of conveyor belts 12, 12', is preferably raised to intersect the transport path of pallet 10. Abutment member 13 thus preferably engages the front face of pallet 10 as conveyor belts 12, 12' preferably continue to move.

Pallet 10 has a preferably rectangular or square base 14 having an underside which rests on conveyor belts 12, 12' and a top side to which support arms 15, 15', having seats $S_1$, $S_1'$, $S_2$, $S_2'$ for supporting armature 11, are affixed.

In the stage of manufacturing shown in FIG. 1, armature 11 has been assembled to the point that it has a lamination stack 23 (without wound coils) assembled on a shaft 16, having shaft ends 16', 16". During such initial manufacturing stages, armature 11 may be transported on pallet 10 with its shaft ends 16', 16" resting in directly opposing seats $S_1$, $S_1'$ of arms 15, 15', respectively.

At a manufacturing stage subsequent to that shown in FIG. 1, a commutator 18 is placed on one end 16" of shaft 16. This placement is preferably accomplished by pressing commutator 18 a predetermined distance onto shaft 16. Pallet 10 of this invention is designed for a situation where the position reached by commutator 18 along shaft 16 after such placement does not allow shaft end 16" to protrude at all beyond commutator end face 18', or allows such protrusion only for a very short length. The absence of a sufficient shaft length protruding from commutator 18 prevents shaft end 16" from fitting into seat $S_1'$, and thus prevents seats $S_1$ and $S_1'$ from continuing to support armature 11 on pallet 10. In the view shown in FIG. 2, pallet 10 has already moved past such a station, and armature 11 is no longer supported in seats $S_1$, $S_1'$.

Instead, to continue the transport of armature 11 after placement of commutator 18, support arms 15, 15' are provided with another set of directly opposing seats $S_2$ and $S_2'$, respectively. Seat $S_2$ preferably is substantially identical to seat $S_1$, while seat $S_2'$ is large enough to accommodate commutator 18. In this way, armature 11 can continue to be supported on pallet 10 by resting shaft end 16' in seat $S_2$ and the commutator circumferential surface 19 in seat $S_2'$.

Figure 2:
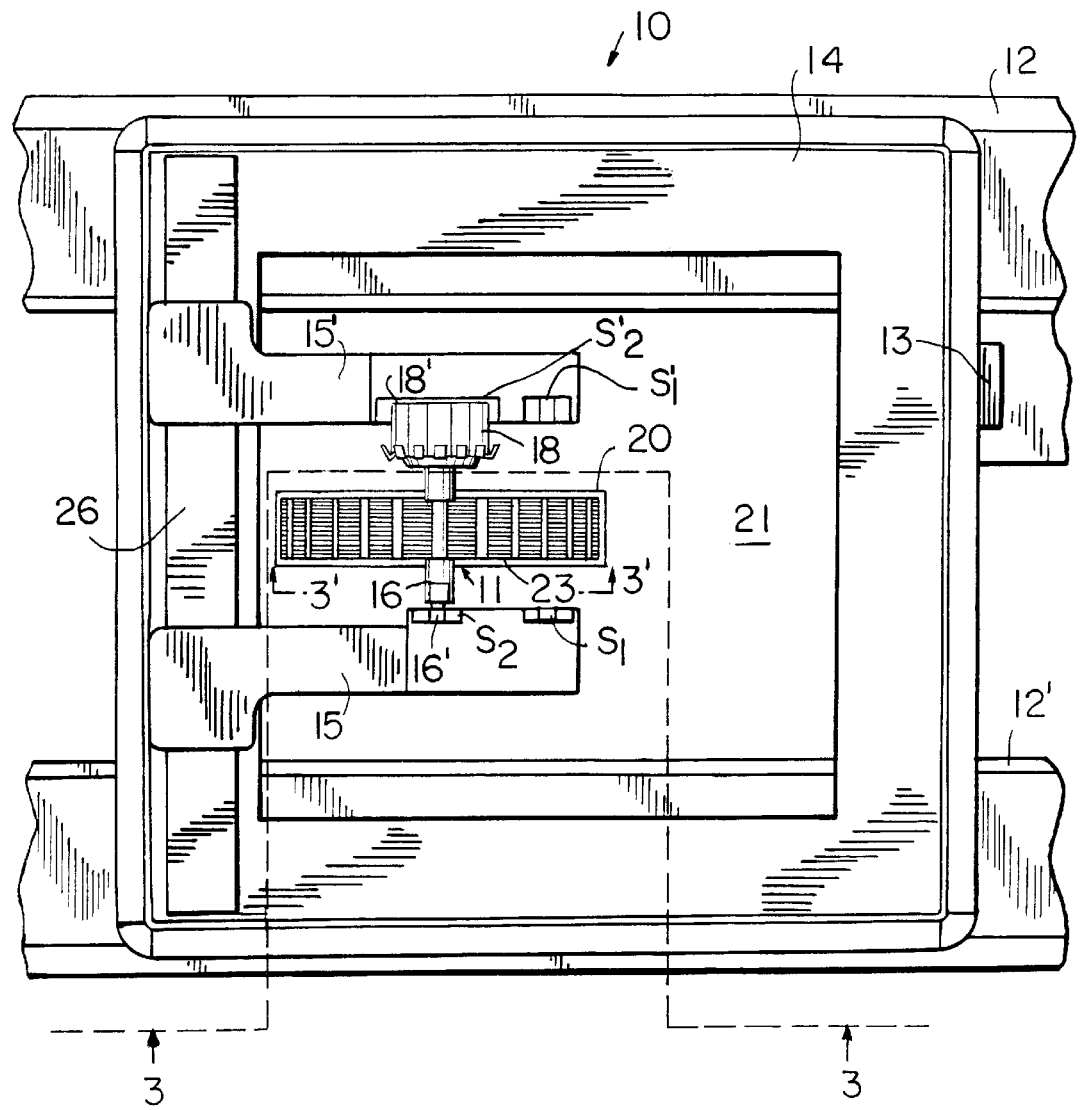
FIG. 2 is a plan view of the pallet of FIG. 1 being advanced by the conveyor of FIG. 1 while carrying an armature in a second armature configuration.
Figure 3:
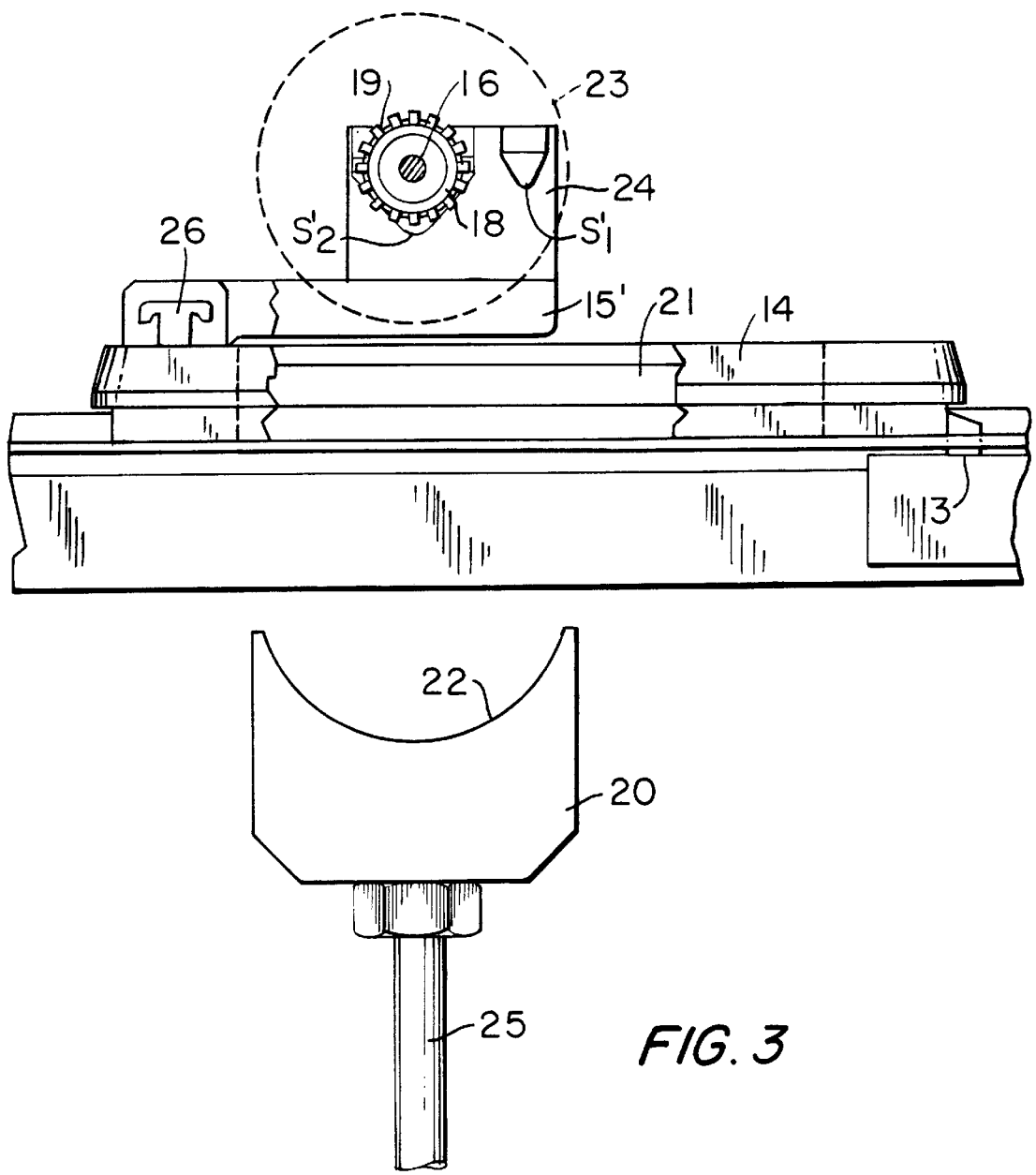
FIG. 3 is a partially fragmentary, partially sectional, elevational view, taken from line 3—3 of FIG. 2, of the pallet, conveyor and armature of FIGS. 1 and 2, in composite with an elevational view, taken from line 3'—3' of FIG. 2, of a cradle forming part of the system according to the invention.

FIG. 3 is a partially fragmentary, partially sectional elevational view, taken from line 3—3 of FIG. 2, showing how circumferential surface 19 of commutator 18 rests in seat $S_2'$, which preferably has a V-shaped configuration. The sides of V-shaped seat $S_2'$ preferably become tangent to surface 19 of commutator 18 when the resting condition is reached, as described above. As shown in FIG. 3, seat $S_1'$ also is configured as a "V" to be used as shown in FIG. 1 to support shaft end 16" for the initial stages of manufacturing. As shown, both seats $S_1'$ and $S_2'$ preferably are located in an upward extension 24 of support arm 15'.

Seats $S_1$ and $S_2$, not shown in the elevational views, are located in support arm 15, preferably also in an upward extension similar to upward extension 24. Seats $S_1$ and $S_2$ preferably also have a "V" shape and preferably are similar in size to seat $S_1'$ shown in FIG. 3. The dimensions of the "V" for any of the seats depend on the diameter of the shaft end or of the commutator which the particular seat must support and on how far the armature should be positioned above pallet base 14 while it is supported for transport.

In order to accommodate the various sizes of armatures that may be required to be accommodated by the system, one can provide a plurality of different upward extensions 24 having the different sizes of seats. The correct upward extensions 24 would preferably be installed in support arms 15, 15' as required. In order to reduce the inventory of different upward extensions 24 to be kept on hand, it may be desirable to have two different sets of seats (not shown) on opposite faces of each upward extension 24, with each upward extension 24 capable of being installed in two different orientations. This can reduce by half the number of upward extensions 24 to be kept on hand. It would only be necessary to insure that each upward extension 24 is installed with the desired face facing the opposing upward extension 24.

Cradle 20, preferably positioned on vertical axis 25, preferably can be lifted or lowered through aperture 21 of pallet 10 by any suitable means such as a pneumatic or hydraulic cylinder, not shown, to remove armature 11 from, or to place armature 11 on, pallet 10 at a processing station. To achieve this, cradle 20 rises along axis 25 so that cradle surface 22 preferably comes into contact with the outer surface of stack 23 (shown in phantom), and then continues to rise so that shaft ends 16', 16" (or commutator 18 if appropriate) are lifted off their respective seats.

Thus, cradles 20 are preferably placed at processing stations where armatures 11 need to be removed from and placed back onto pallet 10 in the manner which has been described. With each cradle 20, there will also be an associated abutment member 13, described previously, positioned to stop the pallet so that the cradle will be aligned with the armature stack as shown in FIG. 3 in order to remove and replace the armature.

Figure 4:
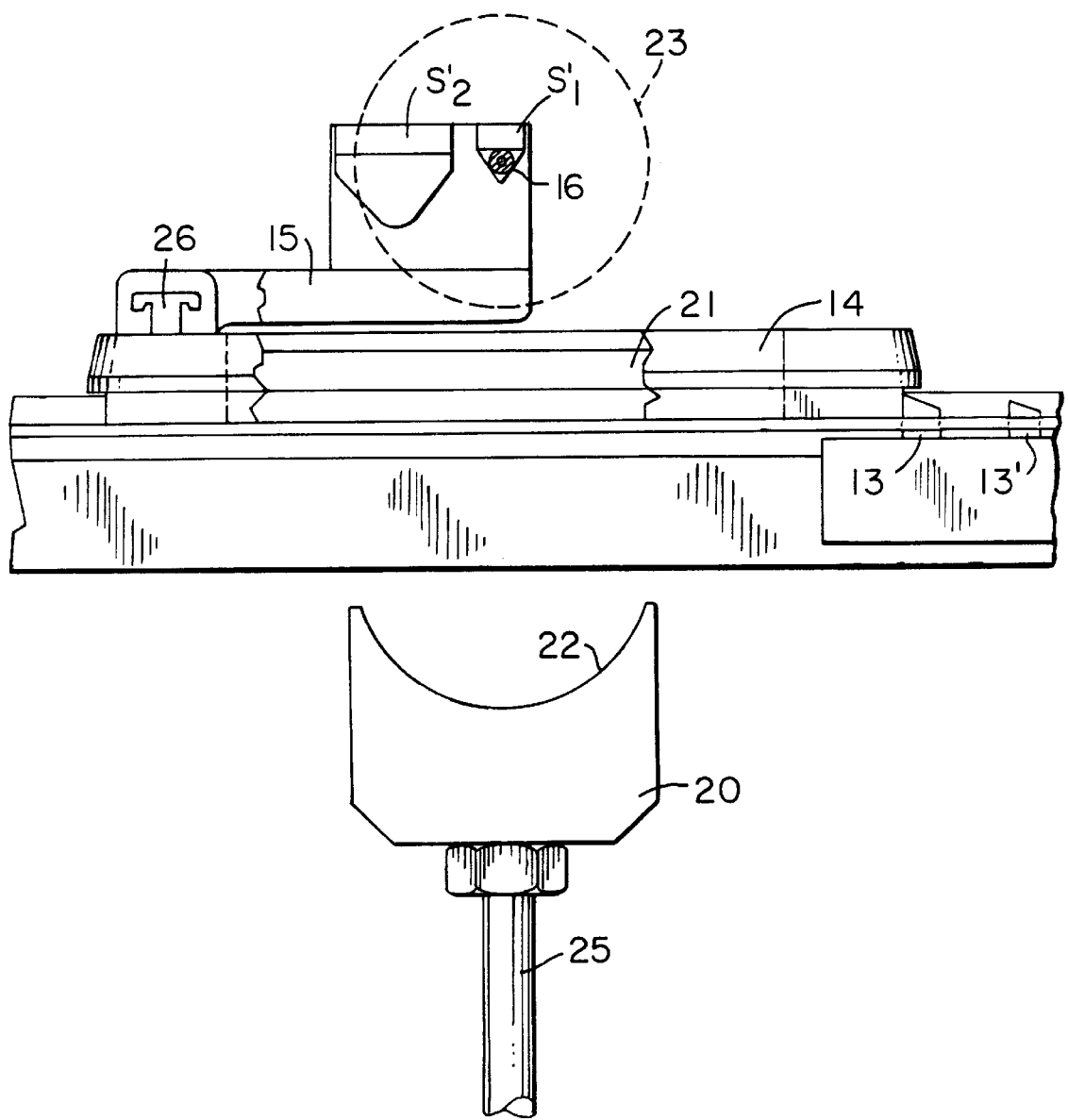
FIG. 4 is a partially fragmentary, partially sectional, elevational view, taken from line 4—4 of FIG. 1, of the pallet, conveyor and armature of FIGS. 1–3, in composite with an elevational view, taken from line 4'—4' of FIG. 1, of a cradle forming part of the system according to the invention.

FIG. 4 is a partially fragmentary, partially sectional elevational view, taken from line 4—4 of FIG. 1, showing shaft end 16" positioned in seat $S_1'$ as is the case when armature 11 is being transported by pallet 10 in the initial manufacturing stages. The armature can be removed from and placed back on seats $S_1$ and $S_1'$ using cradle 20 as described above. Again, abutment member 13 is used to stop pallet 10 so that stack 23 of armature 11 supported by seats $S_1$ and $S_1'$ is aligned with cradle 20. A comparison of FIGS. 3 and 4 shows that in order to assure alignment of cradle 20 with armature 11, the horizontal distance between the front face of pallet 10 and vertical axis 25 when seats $S_1$ and $S_1'$ are to be used preferably is different than that distance when seats $S_2$ and $S_2'$ are to be used. This is preferably controlled by the placement of abutment member 13.

At the particular station where commutator 18 is applied to shaft 16, armature 11 preferably arrives at the station with shaft ends 16', 16" in seats $S_1$, $S_1'$, respectively, but preferably leaves the station with shaft end 16' and commutator 18 in seats $S_2$, $S_2'$, respectively. This is preferably accomplished by providing a second abutment member 13', as shown in FIG. 4, displaced from abutment member 13 along the direction of arrow A by a distance substantially equal to the distance between the imaginary centerline connecting seats $S_1$ and $S_1'$, and the imaginary centerline connecting seats $S_2$ and $S_2'$. First, abutment member 13 would preferably be raised to stop pallet 10 with armature 11 in seats $S_1$, $S_1'$ preferably aligned with cradle 20. Cradle 20 preferably would then be used to lift armature 11 from pallet 10 for placement of commutator 18. During commutator placement, abutment member 13' preferably would be raised and then abutment member 13 preferably would be lowered, causing pallet 10 to advance until it contacts abutment member 13', at which point cradle 20 is preferably aligned with seats $S_2$, $S_2'$. Thus, when commutator placement is complete and cradle 20 is lowered, armature 11 preferably will be properly seated in seats $S_2$, $S_2'$.

After commutator placement, armature 11 preferably is transported by pallet 10 to a winding station to wind coils in the slots of stack 23 and from there to a fusing station where the leads of the coils are fused to commutator 18 in any suitable manner which may be conventional. During the transport which occurs between the stations where the manufacturing stages of winding and fusing are performed, armature 11 continues to be supported on pallet 10 by means of seats $S_2$, $S_2'$. After the fusing operation, at a subsequent station, the commutator preferably may be pressed again, preferably causing it to assume a position along shaft 16 which is nearer to stack 23. This operation preferably allows shaft end 16" to protrude sufficiently from commutator face 18' to make it possible to again support armature 11 in seats $S_1$, $S_1'$ as in FIG. 1. If so, abutment member 13' could be movably mounted as described above in order to move pallet 10 "backwards" against the direction of motion of conveyor belts 12, 12' in order to shift seats $S_1$, $S_1'$ into alignment with armature 11 while armature 11 is supported by cradle 20 for the pressing operation.

Support arms 15, 15' preferably are fixed to the pallet in such a way that they are movable for adjustment on guide 26. The distance between support arms 15, 15' can thus be varied to allow seats $S_1$, $S_1'$, or $S_2$, $S_2'$, respectively, to support armatures having shafts of different lengths, while maintaining alignment of stack 23 with cradles 20 at the various stations along the manufacturing line. However, this distance preferably would be adjusted at the beginning of the manufacturing process to accommodate an armature of a particular length, and preferably would not be adjusted as pallet 10 advances along the manufacturing line.

Seats $S_1$, $S_1'$, $S_2$ and $S_2'$ preferably are closed on their sides which are opposite to the sides facing armature 11. Such closures act as abutment surfaces for the end faces of the armature shafts 16 to avoid movement of armature 11 along the shaft longitudinal axis during transport on pallet 10, which otherwise might cause misalignment with cradles 20.

Although in the preferred embodiment of the invention as shown there is one pair of support arms 15, 15' supporting one pair of upward extensions 24 each having two seats, it is also possible according to the invention to have a second pair of support arms (not shown) supporting a second pair of upward extensions (not shown), with each upward extension, in both the first and second pairs of upward extensions, having only one seat. The second set of support arms might, for example, extend toward support arms 15, 15' from the side of pallet 10 opposite support arms 15, 15', where they might be mounted on a second guide (not shown) similar to guide 26. Such an embodiment would probably necessitate elongation (not shown) of pallet 10 in the direction parallel to conveyor belts 12, 12'. In the operation of such an embodiment, an armature would start out in seats in the first pair of upward extensions, which are similar to seats $S_1$, $S_1'$. After the commutator has been applied to the shaft, the armature would be returned to seats in the second pair of upward extensions, which are similar to seats $S_2$, $S_2'$. Ultimately, after pressing of the commutator further onto the shaft, the armature could be returned to the sets of seats in the first pair of upward extensions.

It should be also noted that while the invention has been described with reference to a manufacturing line along which an armature assumes one of only two configurations, the invention can accommodate a manufacturing line along which the armature assumes one of three or more configurations. In such a system, pallet 10 would be provided with three or more sets of seats, as appropriate, and braking mechanisms as described, or otherwise, would be provided to stop pallet 10 with the appropriate seats in the proper alignment with cradle 20.

Thus it is seen that an armature pallet that can accommodate an armature as its configuration changes through different steps of the armature manufacturing process has been provided. One skilled in the art will appreciate that the present invention can be practiced by other than the described embodiments, which are presented for purposes of illustration and not of limitation, and the present invention is limited only by the claims which follow.

What is claimed is:

1. A pallet for transporting an armature of a dynamoelectric machine along an armature manufacturing line, said armature having a shaft, said shaft having first and second shaft ends, said pallet comprising:

a base; and at least one pair of spaced apart supports on said base; wherein:

said at least one pair of spaced apart supports has at least two sets of seats for receiving said first and second shaft ends, each of said sets including first and second seats;

said first seat of each of said at least two sets of seats is on one member of said at least one pair of spaced apart supports, and said second seat of each of said at least two sets of seats is on another member of said at least one pair of spaced apart supports;

said first and second seats of a first of said sets of seats are in a first seat configuration for accepting said armature when said armature is in a first armature configuration; and said first and second seats of another of said sets of seats are in another seat configuration for accepting said armature when said armature is in another armature configuration different from said first armature configuration; whereby:

when said pallet transports an armature along said armature manufacturing line and said armature is altered, at a station of said manufacturing line, from one of said first and another armature configurations to another of said first and another armature configurations, said armature is placed in one of said first and another sets of seats according to said another of said first and another armature configurations.

2. The pallet of claim 1 wherein:

said at least one pair of spaced apart supports consists of one pair of spaced apart supports including a first support and a second support; and said first seat of each of said at least two sets of seats is on said first support, and said second seat of each of said at least two sets of seats is on said second support.

3. The pallet of claim 1 wherein each of said seats in said at least two sets of seats comprises a substantially V-shaped portion for positive engagement of said respective shaft ends.

4. The pallet of claim 1 wherein said first seat of said first set of seats is substantially identical to said second seat of said first set of seats.

5. The pallet of claim 4 wherein said first seat of said first set of seats is substantially identical to said first seat of said another set of seats.

6. The pallet of claim 1 wherein said first seat of said first set of seats is substantially identical to said first seat of said another set of seats.

7. The pallet of claim 1 wherein said base has an opening therein for passage therethrough of an armature handler for raising armatures from said seats and for lowering armatures into said seats.

8. A system for transporting an armature of a dynamoelectric machine along an armature manufacturing line, said armature having a shaft, said shaft having first and second shaft ends, said armature being altered in shape at stations of said manufacturing line, said system comprising:

a pallet for holding said armature;

a conveyor for transporting said pallet, holding said armature, past said stations of said manufacturing line, defining a path of pallet movement; and a respective brake for stopping a pallet at each station of said manufacturing line; wherein:

said pallet comprises:

a base, and at least one pair of spaced apart supports on said base;

said at least one pair of spaced apart supports has at least two sets of seats for receiving said first and second shaft ends, each of said sets including first and second seats, a first set of seats being separated from another of said sets of seats by a separation distance;

said first seat of each of said at least two sets of seats is on one member of said at least one pair of spaced apart supports, and said second seat of each of said at least two sets of seats is on another member of said at least one pair of spaced apart supports;

said first and second seats of said first of said sets of seats are in a first seat configuration for accepting said armature when said armature is in a first armature configuration; and said first and second seats of said another of said sets of seats are in another seat configuration for accepting said armature when said armature is in another armature configuration different from said first armature configuration; whereby:

when said pallet transports an armature along said armature manufacturing line and said armature is altered, at a station of said manufacturing line, from one of said first and another armature configurations to another of said first and another armature configurations, said armature is placed in one of said at least two sets of seats according to said another of said first and another armature configurations.

9. The system of claim 8 wherein:

said at least one pair of spaced apart supports consists of one pair of spaced apart supports including a first support and a second support; and said first seat of each of said at least two sets of seats is on said first support, and said second seat of each of said at least two sets of seats is on said second support.

10. The system of claim 8 wherein each said respective brake comprises a first abutment member movable between a first brake position out said path of pallet movement and a second brake position in said path of pallet movement; wherein:

said first abutment member is normally in said first brake position; and to stop said pallet at a first pallet position, said first abutment member is moved into said second brake position, whereby said first abutment member prevents said pallet from advancing as said conveyor continues to advance.

11. The system of claim 10 further comprising, at at least one said station of said manufacturing line, an armature handler for raising armatures from said seats and for lowering armatures into said seats; wherein:

said first abutment member is for stopping said pallet at first pallet position in which said armature handler is aligned with said first set of seats;

said respective brake further comprises, at said at least one station, a second abutment member spaced from said first abutment member by said separation distance, and movable between a first brake position out said path of pallet movement and a second brake position in said path of pallet movement;

said second abutment member of is normally in said first brake position;

to stop said pallet at a second pallet position in which said armature handler is aligned with said another second set of seats, said second abutment member is moved into said second brake position, whereby said second abutment member prevents said pallet from advancing as said conveyor continues to advance.

12. The system of claim 8 further comprising, at at least one said station of said manufacturing line, an armature handler for raising armatures from said seats and for lowering armatures into said seats; wherein:

said base has an opening therein for passage therethrough of an armature handler for raising armatures from said seats and for lowering armatures into said seats.

13. The system of claim 8 wherein each of said seats in said at least two sets of seats comprises a substantially V-shaped portion for positive engagement of said respective shaft ends.

14. The system of claim 8 wherein said first seat of said first set of seats is substantially identical to said second seat of said first set of seats.

15. The system of claim 14 wherein said first seat of said first set of seats is substantially identical to said first seat of said another set of seats.

16. The system of claim 8 wherein said first seat of said first set of seats is substantially identical to said first seat of said another set of seats.

17. A method for transporting an armature of a dynamo-electric machine along an armature manufacturing line, said armature having a shaft, said shaft having first and second shaft ends, said armature being altered in shape at at least one station of said manufacturing line, said method comprising:

holding said armature on a pallet;

transporting said pallet, holding said armature, past said stations of said manufacturing line; and stopping said pallet at stations of said manufacturing line; wherein, when said pallet comprises a base, and at least one pair of spaced apart supports on said base:

said holding comprises:

providing said pallet with at least two sets of seats for receiving said first and second shaft ends, each of said sets including first and second seats, a first set of seats being separated from another of said sets of seats by a separation distance, providing said first seat of each of said at least two sets of seats on one member of said at least one pair of spaced apart supports, and said second seat of each of said at least two sets of seats on another member of said at least one pair of spaced apart supports, providing said first and second seats of a first of said sets of seats in a first seat configuration for accepting said armature when said armature is in a first armature configuration, and providing said first and second seats of said another of said sets of seats in another seat configuration for accepting said armature when said armature is in another armature configuration different from said first armature configuration; and said method further comprises:

removing said armature from one of said first and second sets of seats for processing when said pallet is stopped at one of said at least one station;

processing said armature at said one of said at least one station; and returning said armature after processing at said one of said at least one station (a) to said first set of seats when, after said processing step, said armature is in said first armature configuration, and (b) to said another set of seats when, after said processing step, said armature is in said another armature configuration.

18. The method of claim 17 wherein, when said at least one pair of spaced apart supports consists of one pair of spaced apart supports including a first support and a second support, said holding comprises providing said first seat of each of said at least two sets of seats on said first support, and said second seat of each of said at least two sets of seats on said second support.

19. The method of claim 17 wherein:

said removing comprises lifting said armature from said first set of seats; and said returning comprises lowering said armature into one of said at least two sets of seats.

20. The method of claim 17 further comprising, when said armature is altered in configuration at said one of said at least one station:

after said removing, allowing said pallet to move said separation distance; and again stopping said pallet; whereby:

in said returning, said armature is returned to said another set of seats.

21. A method for transporting an armature of a dynamo-electric machine along an armature manufacturing line, said armature having a shaft, said shaft having first and second shaft ends, said armature being altered in shape at at least one station of said manufacturing line, said method comprising:

holding said armature on a pallet;

transporting said pallet, holding said armature, past said stations of said manufacturing line; and stopping said pallet at stations of said manufacturing line; wherein, when said pallet comprises a base, and at least one pair of spaced apart supports on said base:
said holding comprises:
providing said pallet with at least two sets of seats for receiving said first and second shaft ends, each of said sets including first and second seats,
providing said first seat of each of said at least two sets of seats on one member of said at least one pair of spaced apart supports, and said second seat of each of said at least two sets of seats on another member of said at least one pair of spaced apart supports, one of said sets of seats being for accepting said armature when said armature is in a first armature configuration, and another of said sets of seats being for accepting said armature when said armature is in another armature configuration different from said first armature configuration; and said method further comprises:

removing said armature from one of said first and second sets of seats for processing when said pallet is stopped at one of said at least one station;

processing said armature at said one of said at least one station to assume said another armature configuration;

during said processing, moving said seats relative to said one of said at least one station so that one of said sets of seats corresponding to said another armature configuration is in position to receive said armature, and returning said armature after processing at said one of said at least one station to said one of said sets of seats corresponding to said another armature configuration.

22. The method of claim 21 wherein:

said providing of said pallet comprises providing said pallet with said first set of seats being separated from said second set of seats by a separation distance; and moving said seats relative to said one of said at least one station comprises allowing said pallet to move by said separation distance.

* * * * *